United States Patent
Kamenetz et al.

(10) Patent No.: US 11,180,259 B2
(45) Date of Patent: Nov. 23, 2021

(54) SYNTHESIZED LOW-PRESSURE BLEED AIR SCHEME FOR AIRCRAFT BLEED AIR NETWORK

(71) Applicant: HAMILTON SUNDSTRAND CORPORATION, Charlotte, NC (US)

(72) Inventors: Jeffry K. Kamenetz, Windsor, CT (US); Erin G. Kline, Vernon, CT (US); Jeffrey Ernst, Wethersfield, CT (US); Bruce R. Schroder, Agawam, MA (US); Kevin R. DeRoy, Vernon, CT (US); Vince Vessella, Saint-Laurent (CA); Darragh McGrath, Montreal (CA); Adam Fagnani, Montreal (CA); Michel Labrecque, St-Bruno (CA)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 370 days.

(21) Appl. No.: 15/927,653

(22) Filed: Mar. 21, 2018

(65) Prior Publication Data
US 2019/0291876 A1    Sep. 26, 2019

(51) Int. Cl.
| | |
|---|---|
| *B64D 13/08* | (2006.01) |
| *B64D 13/02* | (2006.01) |
| *F02C 9/18* | (2006.01) |
| *F02C 6/08* | (2006.01) |
| *B64D 13/06* | (2006.01) |

(52) U.S. Cl.
CPC ............. *B64D 13/08* (2013.01); *B64D 13/02* (2013.01); *B64D 13/06* (2013.01); *F02C 6/08* (2013.01); *F02C 9/18* (2013.01); *B64D 2013/0618* (2013.01)

(58) Field of Classification Search
CPC ........ B64D 13/08; B64D 13/02; B64D 13/06; B64D 13/04; B64D 2013/0618; F02C 6/08; F02C 9/18
See application file for complete search history.

(56) References Cited

U.S. PATENT DOCUMENTS

| | | | |
|---|---|---|---|
| 5,590,852 A * | 1/1997 | Olson | B64D 13/04 128/204.18 |
| 9,382,841 B2 | 7/2016 | Bruno | |
| 2009/0298407 A1 | 12/2009 | Anderson et al. | |
| 2015/0059397 A1 | 3/2015 | Bruno | |

(Continued)

OTHER PUBLICATIONS

Search Report for European Application No. 19164358.4; Application Filing Date Mar. 21, 2019, dated Jul. 24, 2019 (8 pages).

*Primary Examiner* — Tavia Sullens
(74) *Attorney, Agent, or Firm* — Cantor Colburn LLP (57) ABSTRACT

An aircraft includes one or more engines configured to generate high-pressure bleed air and low-pressure bleed air. An aircraft environmental control system (ECS) is in fluid communication with one or more of the engines to receive the high-pressure bleed air and the low-pressure bleed air. The ECS calculates a synthesized low-pressure value associated with the low-pressure bleed air while still providing bleed air using the high pressure bleed air. The ECS further switches from the high pressure bleed air to the low-bleed pressure air through the ECS while blocking flow of the high-pressure bleed air through the ECS based on the synthesized low-pressure value.

19 Claims, 3 Drawing Sheets

(56) References Cited

U.S. PATENT DOCUMENTS

| | | |
|---|---|---|
| 2015/0107261 A1 | 4/2015 | Moes |
| 2015/0246729 A1 | 9/2015 | Ng |
| 2015/0251765 A1 | 9/2015 | Jonqueres et al. |
| 2016/0101665 A1* | 4/2016 | Followell ............... B64D 13/06 95/25 |
| 2017/0137132 A1 | 5/2017 | Wiegers et al. |
| 2017/0233081 A1* | 8/2017 | Sautron ................. B64D 13/06 60/783 |
| 2018/0057172 A1 | 3/2018 | Sautron |

\* cited by examiner

SYNTHESIZED LOW-PRESSURE BLEED AIR SCHEME FOR AIRCRAFT BLEED AIR NETWORK

BACKGROUND

Exemplary embodiments pertain to the aircraft systems, and more specifically, to aircraft environmental control systems.

An aircraft environmental control system (ECS) typically utilizes bleed air from turbine engines to regulate various aircraft environments such as, for example, cooling and/or heating the aircraft flight decks, cabin, etc. Two types of bleed air sources available for use include a high-pressure bleed air source sometimes referred to High Pressure Port Bleed (HPPB), and low-pressure bleed air source sometimes referred to as Low Pressure Port Bleed (LPPB). LPPB is typically used when available to improve fuel efficiency and prolong engine life. However, LPPB pressure may not reach required levels to maintain desired ECS operations when the engines operate at low power (e.g., during taxi operation, cruise operation or descent). Therefore, HPPB is typically used when the engines operate at low-power operating conditions.

BRIEF DESCRIPTION

According to at least one non-limiting embodiment, an aircraft includes one or more engines configured to generate high-pressure bleed air and low-pressure bleed air. An aircraft environmental control system (ECS) is in fluid communication with one or more of the engines to receive the high-pressure bleed air and the low-pressure bleed air. The ECS calculates a synthesized low-pressure value associated with the low-pressure bleed air while still providing bleed air using the high pressure bleed air, and switches from delivering the high pressure bleed to the low-bleed pressure air through the ECS while blocking flow of the high-pressure bleed air through the ECS based on the synthesized low-pressure value.

According to another non-limiting embodiment, an aircraft environmental control system (ECS) comprises an airflow network including a high-pressure bleed air duct, a low-pressure bleed air duct, at least one air condition unit, at least one valve, and an electronic ECS controller. The high-pressure bleed air duct is configured to receive high-pressure bleed air generated by at least one aircraft engine. The low-pressure bleed air duct is configured to receive low pressure bleed air generated by the at least one aircraft engine. The at least one air condition unit is configured to generate temperature-regulated air based on either the high-pressure bleed air or the low pressure bleed air. The at least one valve is configured to operate in a first position to output the high-pressure bleed air to the air conditioning unit, and a second position to output the low-pressure bleed air to the air conditioning unit. The electronic ECS controller is in signal communication with the airflow network, and is configured to calculate a synthesized low-pressure value associated with the low-pressure bleed air, and to adjust a position of the at least one valve based on the synthesized low-pressure value.

According to yet another non-limiting embodiment, a method of controlling an aircraft environmental control system (ECS) is provided according to a non-limiting embodiment. The method comprises selectively generating high-pressure bleed air and low-pressure bleed air using at least one engine installed on an aircraft, and delivering at least one of the high-pressure bleed air and the low pressure bleed air to an air conditioning unit installed on the aircraft. The method further includes calculating, via electronic ECS controller, a synthesized low-pressure value associated with the low-pressure bleed air while delivering the high pressure bleed air to the air conditioning unit, and switching from delivering the high pressure bleed air to the air conditioning unit to delivering the low-bleed pressure air to the air condition unit, while blocking flow of the high-pressure bleed air through the ECS based on the synthesized low-pressure value.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

The term "about" is intended to include the degree of error associated with measurement of the particular quantity based upon the equipment available at the time of filing the application.

An aircraft ECS can operate using both LPPB provided from a low-pressure bleed port and HPPB provided from a high-pressure bleed port depending on the operating conditions of the engines. The aircraft ECS includes an airflow network having a low-pressure bleed port (sometimes simply referred to as a LPPB) for providing low-pressure bleed air during high-power engine operating conditions, and a high-pressure bleed port (sometimes simply referred to as a HPPB) for providing high-pressure bleed air during low-power engine operating conditions. Conventional airflow networks typically include a pressure sensor installed in the high-pressure bleed air duct so that an engine controller can control the engine power and acceleration. The HPPB pressure (also known the engine compressor pressure) signal can be transmitted to the ECS Controller via digital data buses for controlling the ECS. However, LPPB pressure (also known as P2.7 pressure) sensors are traditionally not relied upon for engine control and hence they are not utilized in the engine control system. In at least one embodiment, the engine controller can be constructed as a Full Authority Digital Engine Control (FADEC). Although LPPB pressure sensors could be justified for the ECS control system, they may not be installed for cost and reliability reasons. Without the pressure sensors installed in the LPPB duct, conventional airflow networks may not effectively determine the presence of operating conditions that allow for reestablishing the low-pressure bleed air duct after activating the high-pressure bleed air duct. Furthermore, an LPPB pressure sensor would not indicate what the LPPB pressure would be while still operating from the HPPB.

One or more non-limiting embodiments described herein provide an aircraft environmental control system that executes a synthesized low-pressure bleed air pressure scheme. The synthesized low-pressure bleed air scheme synthesizes or calculates an accurate pressure value associated with the low-pressure bleed air duct had the engine been providing bleed air from the LPPB instead of the HPPB. In this manner, the aircraft environmental control system can switch to the low-pressure bleed air duct when pressure sensor associated with the high-pressure bleed air indicates that the engine power has reached levels where the low-pressure bleed air can properly operate the ECS. The design philosophy is that the ECS controller selects the LPPB whenever possible. When the LPPB pressure is not adequate to meet the ECS flow requirements, then the ECS controller selects the HPPB. However, it is desirable to return to LPPB at the first opportunity to save on engine fuel costs and reduce engine wear.

Figure 1:
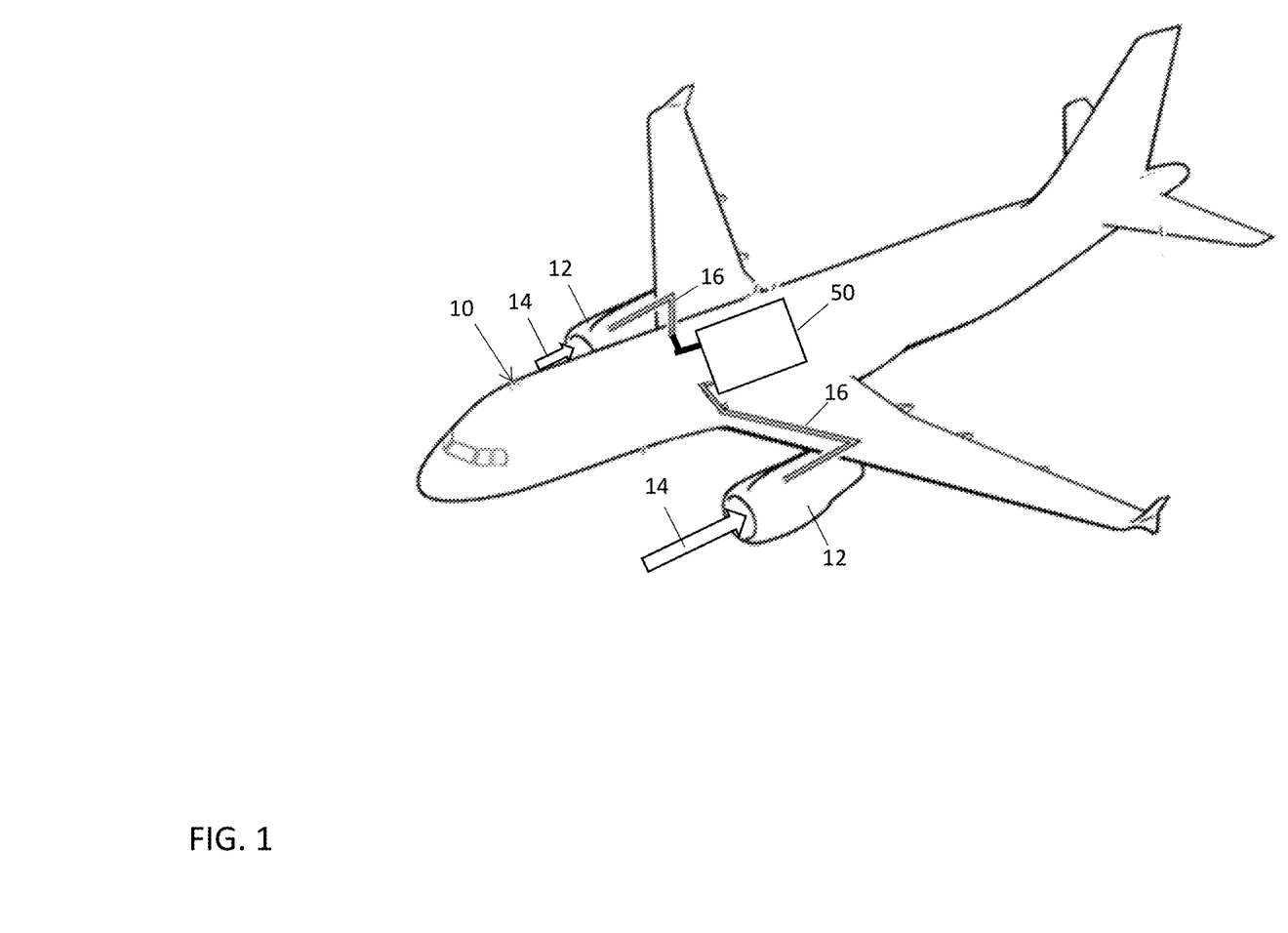
FIG. 1 is diagram of an aircraft including an environmental control system (ECS) according to a non-limiting embodiment.

With reference now to FIG. 1, an aircraft 10 including an environmental control system (ECS) 50 is illustrated according to a non-limiting embodiment. The aircraft 10 includes one or more engines 12. The engines 12 intake air 14, which is compressed in a compressor (not shown). The compressed air is mixed with a fuel burning system (not shown) to generate thrust. A portion of the intake air, typically referred to as bleed air, is diverted to the ECS 50 via one or more bleed air paths 16. The bleed air (e.g., high-pressure bleed air and low-pressure bleed air) is used to control temperatures of various areas of the aircraft 10 such as the cabin and/or flight decks.

Figure 2:
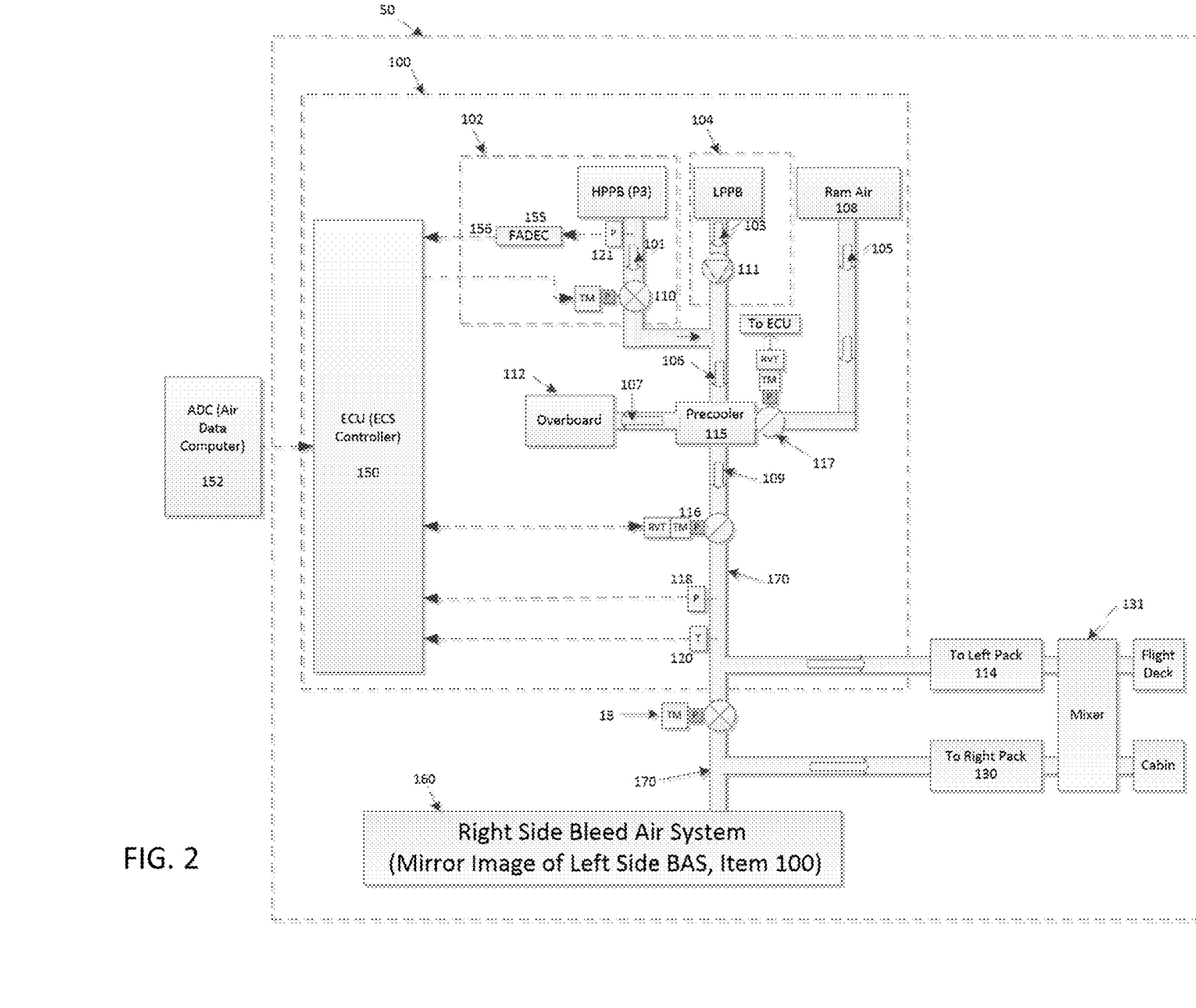
FIG. 2 is a diagram of bleed air system portion of the ECS according to a non-limiting embodiment.

Turning now to FIG. 2, an aircraft environmental control system (ECS) 50 configured to execute a synthesized LPPB pressure scheme is illustrated according to a non-limiting embodiment. The ECS 50 includes an airflow network 100 and an ECS controller 150 configured to control the airflow network 100. In general, the ECS 50 aims to perform air conditioning, while also assisting in cabin pressurization. The ECS 50 includes two airflow network Bleed Air Systems (BASs) 100, 160 and two packs 114, 130. The right BAS 160 is the mirror image of the left airflow network BAS 100.

The aircraft 10 can also include a cross-bleed valve 18, which controls the bleed air source delivered within the ECS 50. The ECS 50 includes a left pack 114, and a right pack 130, and a cross-bleed valve 18. The cross-bleed valve opens a duct between the left engine and left pack, 12 and 114, respectively, and the right engine and right pack, 12 and 130, respectively. The cross-bleed valve can be adjusted at any time (e.g., a controller) to control the bleed air delivered to the ECS 50, thereby allowing the ECS 50 to operating according to different modes as described in greater detail below.

There are two packs in the ECS 50: Left Pack 114 and Right Pack 130 and they are joined by the cross-bleed valve 18. The ECS controller 150 adjusts the position of cross-bleed 18 to allow various ECS configurations such as 2S2P (Two bleed sources and two packs) such that left engine provides bleed air to left pack and right engine provides bleed to right black during normal operation and the cross-bleed valve is closed.

1S1P (One bleed source and one pack) such that during ECS failures, only the left or right engine provides bleed air to either left or right pack and the cross-bleed valve is either closed or open.

As mentioned above, the aircraft engines 12 provide heated high-pressure bleed air 101 and low-pressure bleed air 103. The airflow network 100 includes a high-pressure bleed air network 102 ducting that receives the high-pressure bleed air 101, and a low-pressure bleed air network 104 ducting that receives the low-pressure bleed air 103. An output duct 106 commonly connects the output of the high-pressure bleed air network 102 ducting and the output of the low-pressure bleed air network 104 ducting.

The high-pressure bleed air network 102 ducting further includes a high-pressure bleed air shutoff valve 110. The high-pressure bleed air shutoff valve 110 selectively controls the output of the high-pressure bleed air network 102 ducting and the output of the low-pressure bleed air network 104 ducting. When the aircraft 10 is operating at low-engine power, the high-pressure bleed air shutoff valve 110 can be opened such that the high-pressure bleed air 101 is delivered through the airflow network 100. Once the high-pressure bleed air shutoff valve 110 is opened, a check valve 111 installed in the low-pressure bleed air network 104 ducting is forced closed, thereby blocking the low-pressure bleed air 103 from flowing through the airflow network 100. When, however, the aircraft 10 is operating at high-power conditions, the high-pressure bleed air shutoff valve 110 can be closed which in turn opens the check valve 111 such that the low-pressure bleed air 103 flows through the airflow network 100. The airflow system 100 also includes a ram air system 108 and a precooler 115. The ram air system 108 generates cool air 105 (also known as a cold sink system) which can be used to cool the bleed air 101 or 103 delivered to the precooler 115. During the cooling process, an amount of heated ram air 107 is produced. This heated ram air 107 is ejected into the atmosphere via an overboard port 112 so that it is prevented from entering the cabin.

The pre-cooled air 109 passes through pressure regulating shutoff valve 116 and is output to bleed manifold 170 and is then delivered to an air conditioning unit 114, sometimes referred to as a pneumatic air cycle kit (pack)

The airflow network 100 can also include a bleed manifold pressure sensor 118 and a bleed manifold temperature sensor 120 to provide temperature measurements and pressure measurements, respectively, associated with the bleed manifold 170. These feedback signals allow the ECS controller 150 to regulate the pressure of bleed manifold 170 using the pressure regulating valve 116 and the temperature of the bleed manifold 170 using ram air control valve 117. The bleed manifold pressure sensor 118 and/or bleed manifold temperature sensor 120 can be located at different locations than illustrated in FIG. 2 without departing from the scope of the invention.

In addition, an electronic air data computer (ADC) 152 can be installed on the aircraft 10, and can operate to determine (e.g., calculate) ambient pressure ($P_{amb}$) and/or ambient temperature ($T_{amb}$) values.

The pack 114 utilizes an air cycle machine which converts the pre-cooled air 109 into temperature-regulated air. Air output from the pack 114 is delivered to a mixing and distribution unit 131 which serves to mix air output from the pack 114 with cabin air. The mixed air can also be delivered to different zones of the aircraft 10. Although the airflow system 100 is illustrated with respect to a single left pack 114 and a single engine 12, it should be appreciated that airflow system can operate to control one or more additional packs 114 corresponding to one or more additional engines 12 of the aircraft 10.

In any of the operating modes provided by the airflow system 100, the ECS controller 150 can generate a control signal that adjusts a position of the high-pressure bleed air shutoff valve 110, thereby selectively controlling delivery of the high-pressure bleed air 101 and low-pressure bleed air 103 to the pack 114. As described above, when the high-pressure bleed air shutoff valve 110 is closed, the check valve 111 is automatically opened. Accordingly, high-pressure bleed air 101 is blocked from entering the output duct 106 while the low-pressure bleed air 103 is delivered to the output duct 106 and is ultimately used to provide bleed air to pack 114. When the high-pressure bleed air valve 110 is opened, the check valve 111 is automatically closed. Accordingly, the low-pressure bleed air 103 is blocked from entering the output duct 106 while the high-pressure bleed air 101 is delivered to the output duct 106 and is ultimately used to provide bleed air to the pack 114. Unlike a conventional ECS, however, the ECS controller 150 included in the ECS 50 executes a synthesized low-pressure bleed air scheme which effectively determines when to adjust (e.g., close) the high-pressure bleed air shutoff valve 110 after selecting the high-pressure bleed air 101 to be used to provide bleed air to the pack 114. In this manner, the ECS controller 150 can detect conditions which allow usage of the low-pressure bleed air 103, and can close the valve 110 such that the low-pressure bleed air 103 is delivered from the output duct 106 to provide bleed air to the pack 114. The synthesized low-pressure bleed air scheme is described in greater detail below.

Figure 3:
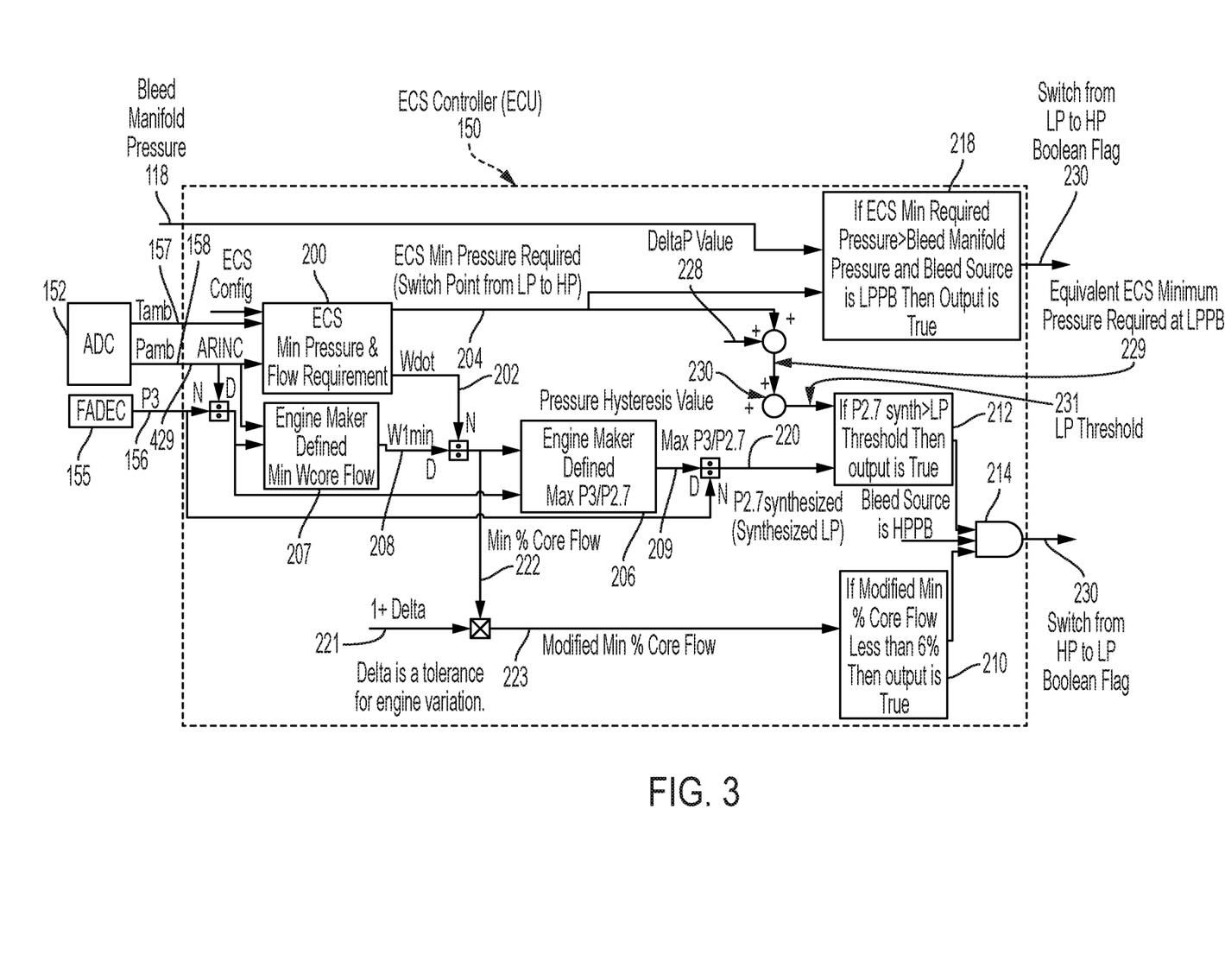
FIG. 3 is a functional block diagram of logic within an ECS controller capable of executing a low-pressure bleed air scheme to control an ECS according to a non-limiting embodiment.

Turning now to FIG. 3, in at least one embodiment, the ECS controller 150 normally determines when to invoke the bleed selection transition from LPPB to HPPB. The ECS controller 150 determines the transition based on a comparison between the ECS minimum pressure required 204 (described below) and the actual pressure of the bleed manifold 170 measured by sensor 118. In at least one embodiment, the ECS minimum pressure required 204 corresponds to the pressure at the bleed manifold 170 which is at the PRSOV 116 Outlet. When the pressure is too low, the ECS controller 150 outputs a logic "1"/True signal from the high pressure bleed air selection evaluator 218, which commands the high-pressure bleed air shutoff valve 110 into the open position. As a result, the check valve 111 is automatically closed, and the high-pressure bleed air 101 is output from the bleed air network (i.e., from output 106) to supply bleed air to pack 114. The right side of the ECS operates similar to the left side and air is supplied to pack 130.

In at least one embodiment, that the PRSOV's pressure regulation point is set to a value higher than ECS minimum pressure required 204. Accordingly, when there is adequate LPPB pressure, the PRSOV 116 modulates open under closed loop control by the ECS controller 150 such that PRSOV 116 is partially open. However, when the LPPB is too low to allow the PRSOV 116 to close loop at the desired PRSOV pressure reference, the PRSOV 116 is commanded full open. Even though the PRSOV 116 is open and not closing loop on the desired pressure of the bleed manifold 170, the bleed manifold pressure could still be above the ECS minimum pressure required 204. Hence, the ECS controller 150 could still operate the ECS 50 on LPPB, resulting in further fuel savings and engine life. However, once the pressure of the bleed manifold 170 as measured by pressure sensor 118 is less than ECS minimum pressure required 204, the ECS controller 150 switches from LPPB to HPPB. As an alternate scheme to high pressure bleed air selection evaluator 218, the ECS controller 150 can recognize that a pack's flow control valve (not shown in FIG. 2) is full open and that that the flow measured by the pack 114 is insufficient requiring that the bleed source must transition from LPPB to HPPB.

The flow corresponding to the ECS minimum pressure required 204 is Wdot 202 per schedule 200. That is, ECS minimum pressure required 204 is the pressure at the bleed manifold 170 needed to achieve the flow Wdot 202. Wdot 202 is equal to the required pack 114 flow plus incidental bleed consumer flows such as de-ice system flow, inert gas system flow, waste-water system flow, etc. Required pack flows are determined by certifying authority entities (e.g., FAA) for fresh air requirements and/or aircraft specific heating and cooling requirements for the passengers and crew.

Complex systems such as an ECS 50 are typically computer simulated using thermodynamic and fluids dynamics models. These models allow creation of schedules like 200 of 202 or 204 values relatively easily.

Once the HPPB is selected to provide bleed air to the pack 114, the ECS controller 150 must then determine if the LPPB pressure is high enough to meet the ECS minimum pressure requirements. Thus, an ECS controller 150 capable of executing a low-pressure bleed air scheme is illustrated according to a non-limiting embodiment. The ECS controller 150 includes an ECS minimum pressure requirement and flow requirement schedule 200, an engine maker defined minimum Wcore flow schedule 207, an engine maker defined max P3/P2.7 ratio schedule 206, a low-pressure bleed air evaluator 212, and a percentage core flow evaluator 210. In at least one embodiment, the ECS minimum pressure required 204 corresponds to the bleed manifold 170 pressure located at the outlet of the PRSOV 116. The ECS controller 150 can be constructed as an electronic hardware controller that includes memory and a processor configured to execute algorithms and computer-readable program instructions stored in the memory. As described herein, a schedule is a mathematical function where one or more input variables are used to determine an output based on linear interpolation between discrete points or a lookup table. An evaluator is a conditional statement that yields a Boolean (True/False) result. In addition, the schedule and the evaluator described herein can be constructed as individual computational processing units configured to execute software to perform mathematical operations and output signals indicative of a determined output.

The ECS required airflow schedule 200 has two outputs. A first output is referred to as an ECS required flow 202, also referred to as Wdot. A second output is referred to as an ECS minimum pressure required 204 and represents the point in the ECS 50 corresponding to the location of bleed manifold pressure sensor 118 (at the outlet of the PRSOV 116). The ECS minimum pressure required 204 is the minimum pressure required to achieve the ECS required flow Wdot 202. The inputs to the ECS required airflow schedule 200 are ECS Configuration (see below), ambient temperature ($T_{amb}$) 157 and ambient pressure ($P_{amb}$) 158 from the ADC (Air Data Computer) 152 to the ECS controller 150 via a digital bus such as, for example, ARINC-429.

The engine maker defined minimum Wcore flow schedule 207 includes an output minimum engine core airflow, also referred to as W1 min, 208. The inputs to engine maker defined minimum Wcore flow schedule 207 are the value of ambient pressure ($P_{amb}$) 158 and the ratio of engine compressor absolute pressure (P3) 156 to ambient pressure ($P_{amb}$) 158. The ratio is also referred to as "overall compression pressure ratio". In at least one embodiment, the HPPB pressure sensor 121 is read by the FADEC 155 and transmitted to the ECS Controller 150 as item 156 via a serial data link such as, for example, ARINC-429.

The engine maker defined max P3/P2.7 ratio schedule 206 generates an output of maximum P3/P2.7 209 based on an input minimum percent core flow 222 and the ratio of engine compressor absolute pressure (P3) reading 156 to an ambient pressure ($P_{amb}$) 158. In at least one embodiment, the minimum percent core flow is the value of ECS required flow (Wdot 202) divided by W1 min 208.

The minimum Wcore flow schedule 207 and max P3/P2.7 ratio schedule 206 schedules are generated as follows. First, while using the HPPB as the source of bleed air, ECS bleed flow, power lever angle setting, ambient pressure and ambient temperature are input into a computer simulation of the engine. Then using the same input conditions except that the source of bleed air is LPPB, the computer simulation is run again. The process is repeated through hundreds of operating conditions.

The data is then analyzed and correlated to develop the two schedules. Map 206 is then derived by taking the P3 value from the simulation run using HPPB and dividing by the P2.7 values from the simulation run using LPPB at each operating condition.

When running the engine simulation, the simulation is adjusted to account for performance variation due to production variances and degradation over time. For example, minimum Wcore flow schedule 207 schedule is based on best performing engines such that use the least amount of airflow to provide a given thrust. Correspondingly, max P3/P2.7 ratio schedule 206 schedules is based on poor performing engines that require relatively high amounts of HP pressure to produce a given thrust.

The low-pressure bleed air selection evaluator 212 generates an output that is "True" or "logic 1", for example, when the inputs are such that P2.7Synthesized (also known as a synthesized low-pressure pressure value) 220 is greater than a pressure threshold value, i.e., LP Threshold 231. In at least one embodiment, the LP threshold value is equal to the ECS minimum pressure required at a bleed manifold plus a correction for both the ducting and the second valve being full open, plus a hysteresis value.

While actually operating from high pressure bleed, the synthesized low pressure value predicts the pressure at the low-pressure bleed air network 104 ducting when the ECS 50 begins operating on low pressure. In at least one embodiment, the P2.7Synthesized 220 can be calculated as the engine compressor pressure (P3) sensor 121 reading 156 (transmitted by the FADEC 155 to the ECS Controller 150) divided by the maximum P3/P2.7 209. In at least one embodiment, P2.7Synthesized 220 will be the pressure at station 2.7 when operating on LPPB post switching.

The LP Threshold 231 is the equivalent ECS minimum pressure required at LPPB 229 (described below) plus a hysteresis value 230. The hysteresis value 230 is chosen to prevent the ECS controller 150 from repeatedly switching between HPPB and LPPB sources. Typical values range, for example, from about 1 pounds per square inch absolute (PSIA) to about 15 PSIA. The smaller the value, the more likely that the ECS controller 150 will repeatedly switch between HPPB and LPPB. The larger the value of the hysteresis, the longer the ECS 50 will remain using the HPPB as the source of bleed air.

The Equivalent ECS Minimum Pressure Required at LPPB 229 is equal to the ECS Minimum Pressure required 204 at the bleed manifold along with a pressure drop DeltaP 228. DeltaP 228 is equal to the pressure drop in the mechanical ducting and the outlet of the PRSOV 116 from LPPB to the bleed manifold if the ECS 50 was operating on LPPB. The DeltaP Value is calculated based on the flow rate through the airflow network 100 as measured by a flow measurement sensor (not shown in FIG. 2) in pack 114. Also, the pressure drop DeltaP assumes that the PRSOV 116 will be full open immediately after transitioning back to LPPB. As a practical matter, DeltaP can be set to a fixed value although the algorithm accuracy will be degraded but possibly acceptable.

In the alternative, either DeltaP 228 or equivalent ECS minimum 229 can be calculated similarly to ECS minimum pressure required 204 with relatively good accuracy. That is, 228 or 229 can be calculated as a schedule using inputs of ECS configuration (see below), ambient temperature ($T_{amb}$) 157 and ambient pressure ($P_{amb}$) 158 from the ADC (Air Data Computer) 152 to the ECS controller 150 via a serial digital data bus such as, for example, ARINC-429. As stated earlier, complex systems such an ECS 50 are typically computer simulated using thermodynamic and fluids dynamics models. These models allow creation of schedules like 200 of 228 or 229 values relatively easily.

A modified minimum percentage core flow evaluator 210 generates an output that is True or logic "1", for example, when the modified minimum percent core flow 223 is less than a threshold value, e.g., 6%. Value 223 is defined as minimum percentage core flow 222 multiplied by a value (1 plus Delta) 221. The value of 6% is given as a representative example, but it should be appreciated that the value can be adjusted to the specific engine maker's requirements. The value "Delta" accounts for engine variability and typically is a number ranging, for example, from about 0.03 to about 0.20. The smaller the delta value (i.e., difference), the more likely that the ECS controller 150 will repeatedly switch between HPPB and LPPB due to engine variability from the nominal values put in schedules 207 and 206. The higher the delta value, the longer the ECS controller 150 will maintain selection of the HPPB as the source of bleed air.

Alternatively, the schedules associated with schedules 207 and 206 could be based on the weakest engine in the engine production population and the value of Delta in (1 plus Delta) 221 could be reduced. In at least one embodiment, not all engines need to have a core limit criteria. In these cases, evaluator 210 can be eliminated.

The ECS required airflow schedule 200 is based on the input ECS configuration (also referred to as a current operating mode) of the airflow system 100. As described above, the airflow system 100 can operate in various different modes (e.g., two engines 12 and two packs 114/130, one engine 12 and one pack 114/130, etc.). The airflow system operating mode affects the airflow through the airflow system 100. In this manner, the operating mode can dictate individual pressure requirements (e.g., pressure thresholds) associated with the airflow system 100. For example, operating the airflow system 100 according to two engines 12 and two packs 114 and 130 can require different pressure flow requirements compared to operating the airflow system one engine 12 and one pack (e.g., pack 114). As stated above, the two-engine/two-pack operating mode is the normal ECS configuration while the one-engine/one-pack operating mode is can occur during ECS failures. If there are ECS failures, the remaining operating pack is typically operating at higher capacity than normal to make up for the non-operating pack.

Various states of the ECS (e.g., bleed manifold pressure, bleed manifold temperature, air flow through the pack, etc.) can be determined, for example, by obtaining various measurements (e.g., pressure, temperature and airflow) at the output of the precooler 115. In at least one embodiment, the ECS required airflow schedule 200 is based on the current aircraft 10 operating conditions such as ambient temperature value ($T_{amb}$) 157 and ambient pressure value ($P_{amb}$) 158. The temperature value ($T_{amb}$) 157 and the ambient pressure value ($P_{amb}$) 158 can be provided by determined by the ADC 152, and transmitted to the ECS controller 150 for use as inputs to the ECS minimum pressure required and flow requirement schedule 200, etc.

The "AND" Gate 214 is in signal communication with the core airflow ratio evaluator 210 and the low-pressure bleed selection evaluator 212. In at least one embodiment, the AND Gate 214 output is "True" or a logic "1" if the bleed source is HPPB, the output of evaluator 212 is "True" or a logic "1" and the output of evaluator 210 is "True" or a logic "1".

In at least one embodiment, once the bleed source is HPPB, the output of the low-pressure bleed air selection evaluator 214 is utilized as a valve control signal which closes the high-pressure bleed air valve 110. For example, "True" or a logic "1" signal output from the low-pressure bleed air selection "AND" Gate 214 can command the high-pressure bleed air shutoff valve 110 into the closed position. As a result, the check valve 111 is automatically opened and the low-pressure bleed air 103 is output from the bleed air network (i.e., from output 106) to provide bleed air to pack 114 high-pressure bleed air shutoff valve 110

As described above, various non-limiting embodiments provide an aircraft environmental control system that executes a synthesized LPPB pressure scheme. The synthesized LPPB pressure scheme synthesizes or estimates an accurate pressure associated with the LPPB duct while extracting bleed air 101 from the HPPB network 102 ducting using ambient pressure 158 and ambient temperature 157 readings from the ADC 152 and engine compressor (P3) pressure sensor 121 reading 156 from FADEC 155 to the ECS Controller 150. The three readings are transmitted via digital buses using a protocol such ARINC-429. Unlike conventional environmental control systems, one or more embodiments of the aircraft environmental control system described herein can switch to the HPPB when pressure sensor associated with the HPPB duct indicates the engine power is low, and can switch back to the LPPB duct when the synthesized LPPB pressure indicates that the engine power has reached levels where the LPPB can properly operate the environmental control system.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method of controlling an aircraft environmental control system (ECS), the method comprising:
    selectively generating high-pressure bleed air and low-pressure bleed air using at least one engine installed on an aircraft;
    selectively delivering at least one of the high-pressure bleed air and the low-pressure bleed air to an air conditioning unit installed on the aircraft;
    measuring, via a pressure sensor, a pressure of the high-pressure bleed air;
    determining a predetermined schedule of bleed air pressure ratio values by simulating a plurality of high-pressure bleed air values with respect to a plurality of simulated low-pressure bleed air values over a plurality of operating conditions, and storing the schedule of bleed air pressure ratio values in an electronic ECS controller,
    calculating, via the electronic ECS controller, a synthesized low-pressure value associated with the low-pressure bleed air while delivering the high-pressure bleed air to the air conditioning unit, wherein the synthesized low-pressure value is calculated as the measured pressure of the high-pressure bleed air divided by a maximum value of the bleed air pressure ratio values; and
    switching from delivering the high-pressure bleed air to the air conditioning unit to delivering the low-pressure bleed air to the air conditioning unit while blocking flow of the high-pressure bleed air through the ECS based on the synthesized low-pressure value.

2. The method of claim 1, wherein the synthesized low-pressure value is indicative of the pressure at the low-pressure bleed air duct after switching to delivering the low-pressure bleed air to the air conditioning unit while blocking flow of the high-pressure bleed air through the ECS.

3. The method of claim 1, wherein selectively delivering at least one of the high-pressure bleed air and the low-pressure bleed air to the air conditioning unit comprises:
    delivering the high-pressure bleed air to a high-pressure bleed air duct;
    delivering the low-pressure bleed air to a low-pressure bleed air duct;
    adjusting at least one valve that is in fluid communication with the high-pressure bleed air duct into a first position to control flow of the high-pressure bleed air through the air condition unit; and
    adjusting the at least one valve into a second position to control flow of the low-pressure bleed air through the air condition unit,
    wherein the ECS controller adjusts the at least one valve into the first and second positions based on the synthesized low-pressure value.

4. The method of claim 3, wherein adjusting the at least one valve further comprises:
    comparing, via the ECS controller, the synthesized low-pressure value to a low-pressure (LP) threshold value; and
    adjusting the at least one valve into the second position to output the low-pressure bleed air in response to the synthesized low-pressure value being greater than the LP threshold value.

5. The method of claim 4, wherein adjust the at least one valve further comprises:
    adjusting the at least one valve to invoke the first position to output the high-pressure bleed air in response to a ECS minimum pressure required at a bleed manifold being greater than the bleed manifold pressure; and after invoking the first position of the valve, returning the at least one valve to the second position to output the low-pressure bleed air in response to the synthesized low-pressure value being greater than the LP threshold value.

6. An aircraft environmental control system (ECS) comprising:

an airflow network including:

a high-pressure bleed air duct configured to receive high-pressure bleed air generated by at least one aircraft engine;

a pressure sensor configured to measure a pressure of the high-pressure bleed air;

a low-pressure bleed air duct configured to receive low-pressure bleed air generated by the at least one aircraft engine;

at least one air condition unit configured to generate temperature-regulated air using either the high-pressure bleed air or the low-pressure bleed air;

at least one valve configured to receive the high-pressure bleed air, the at least one valve configured to operate in a first position to control flow of the high-pressure bleed air through the air conditioning unit, and a second position to control flow of the low-pressure bleed air through the air conditioning unit; and an electronic ECS controller in signal communication with the airflow network, the electronic ECS controller configured store a predetermined schedule of bleed air pressure ratio values between simulated high-pressure bleed air values and simulated low-pressure bleed air values, to calculate a synthesized low-pressure value associated with the low-pressure bleed air, and to adjust a position of the at least one valve based on the synthesized low-pressure value, wherein the synthesized low-pressure value is calculated as the measured pressure of the high-pressure bleed air divided by a maximum value of the bleed air pressure ratio values.

7. The ECS of claim 6, wherein the synthesized low-pressure value is indicative of the pressure at the low-pressure bleed air duct after the at least one valve is adjusted to operate in the second position.

8. The aircraft ECS of claim 6, wherein the ECS controller compares the synthesized low-pressure value to a low-pressure (LP) threshold value, and adjusts the at least one valve into the second position to output the low-pressure bleed air in response to the synthesized low-pressure value being greater than the LP threshold value.

9. The aircraft ECS of claim 8, wherein the ECS controller calculates the synthesized low-pressure value based on a required amount of airflow through the at least one engine, ambient temperature, ambient pressure, ECS operating mode, and the measured pressure of the high-pressure bleed air.

10. The aircraft ECS of claim 9, wherein the aircraft includes a plurality of engines, and wherein the ECS is configured to operate in a plurality of different operating modes, a first mode among the plurality of operating modes configured to generate the high-pressure bleed air and the low-pressure bleed air from at least two engines among the plurality of engines, and a second operating mode among the plurality of operating modes configured to generate the high-pressure bleed air and the low-pressure bleed air from a single engine among the plurality of engines.

11. The aircraft ECS of claim 10, wherein the ECS controller determines the LP threshold value based on a current operating mode among the plurality of different operating modes of the ECS.

12. The aircraft ECS of claim 11, wherein the ECS controller adjusts the at least one valve into the first position to output the high-pressure bleed air in response to an ECS minimum pressure required at a bleed manifold being greater than the bleed manifold pressure, and after invoking the first position of the valve, returns the at least one valve to the second position to output the low-pressure bleed air in response to the synthesized low-pressure value being greater than the LP threshold value.

13. An aircraft comprising:

at least one engine configured to generate high-pressure bleed air and low-pressure bleed air; and an aircraft environmental control system (ECS) in fluid communication with the at least one engine to receive the high-pressure bleed air and the low-pressure bleed air, the ECS including:

an airflow network including a high-pressure bleed air duct to receive the high-pressure bleed air, a low-pressure bleed air duct to receive the low-pressure bleed air;

at least one valve that receives the high-pressure bleed air, the at least one valve configured to operate in a first position to control flow of the high-pressure bleed air through the high-pressure bleed air duct and a second position to control flow of the low-pressure bleed air through the low-pressure bleed air duct;

a pressure sensor configured to measure a pressure of the high-pressure bleed air;

an electronic ECS controller configured to store a predetermined schedule of bleed air pressure ratio values between simulated high-pressure bleed air values and simulated low-pressure bleed air values, to calculate a synthesized low-pressure value associated with the low-pressure bleed air while still providing bleed air using the high-pressure bleed air, and to control the at least one valve to transition from the first position to the second position so as to switch from delivering the high-pressure bleed air to the low-bleed pressure air through the ECS while blocking flow of the high-pressure bleed air through the ECS based on the synthesized low-pressure value, wherein the synthesized low-pressure value is calculated as the pressure of the measured high-pressure bleed air divided by a maximum value of the bleed air pressure ratio values.

14. The aircraft of claim 13, wherein the synthesized low-pressure value is indicative of the pressure at the low-pressure bleed air duct after the at least one valve is adjusted to operate in the second position.

15. The aircraft of claim 13, wherein the ECS controller compares the synthesized low-pressure value to a low-pressure (LP) threshold value, and adjusts the at least one valve into the second position to output the low-pressure bleed air in response to the synthesized low-pressure value being greater than the LP threshold value.

16. The aircraft of claim 15, wherein the ECS controller calculates the synthesized low-pressure value based on a required amount of bleed airflow capability through the at least one engine, ambient temperature, ambient pressure, ECS operating mode, and the measured pressure of the high-pressure bleed air while operating from a high-pressure bleed port.

17. The aircraft of claim 16, wherein the aircraft includes a plurality of engines, and wherein the ECS is configured to operate in a plurality of different operating modes, a first mode among the plurality of operating modes configured to generate the high-pres sure bleed air and the low-pressure bleed air from at least two engines among the plurality of engines, and a second operating mode among the plurality of operating modes configured to generate the high-pressure bleed air and the low-pressure bleed air from a single engine among the plurality of engines.

18. The aircraft of claim 17, wherein the ECS controller determines an ECS minimum pressure required value at a bleed manifold and the LP threshold value at a low-pressure bleed port based on a current operating mode among the plurality of different operating modes of the ECS while operating from the high-pressure bleed port.

19. The aircraft of claim 18, wherein the ECS controller adjusts the at least one valve to invoke the first position to output the high-pressure bleed air in response to the ECS minimum pressure required at the bleed manifold being greater than the bleed manifold pressure, and after invoking the first position of the valve, returns the at least one valve to the second position to output the low-pressure bleed air in response to the synthesized low-pressure value being greater than the LP threshold value.

* * * * *